(12) United States Patent
Manske et al.

(10) Patent No.: US 11,455,639 B2
(45) Date of Patent: Sep. 27, 2022

(54) UNSUPERVISED UNIVERSAL ANOMALY DETECTION FOR SITUATION HANDLING

(71) Applicant: SAP SE, Walldorf (DE)

(72) Inventors: Knut Manske, Oftersheim (DE); Manuel Vietze, Mannheim (DE)

(73) Assignee: SAP SE, Walldorf (DE)

( * ) Notice: Subject to any disclaimer, the term of this patent is extended or adjusted under 35 U.S.C. 154(b) by 377 days.

(21) Appl. No.: 16/887,681

(22) Filed: May 29, 2020

(65) Prior Publication Data

US 2021/0374755 A1    Dec. 2, 2021

(51) Int. Cl.
| | |
|---|---|
| *G06F 16/904* | (2019.01) |
| *G06Q 20/40* | (2012.01) |
| *G06N 3/08* | (2006.01) |
| *G06Q 30/06* | (2012.01) |
| *G06Q 10/06* | (2012.01) |
| *G06F 16/215* | (2019.01) |

(52) U.S. Cl.
CPC ....... *G06Q 20/4016* (2013.01); *G06F 16/215* (2019.01); *G06F 16/904* (2019.01); *G06N 3/088* (2013.01); *G06Q 10/0635* (2013.01); *G06Q 30/0637* (2013.01)

(58) Field of Classification Search
CPC ..... G06F 16/215; G06F 16/904; G06F 16/285
See application file for complete search history.

(56) References Cited

U.S. PATENT DOCUMENTS

| | | |
|---|---|---|
| 8,015,080 B2 | 9/2011 | Kerschbaum et al. |
| 10,373,056 B1 | 8/2019 | Andoni et al. |

(Continued)

FOREIGN PATENT DOCUMENTS

| | | | | |
|---|---|---|---|---|
| CN | 109542740 A | * | 3/2019 | .......... G06F 11/3452 |
| CN | 110888788 A | * | 3/2020 | |

(Continued)

OTHER PUBLICATIONS

Das, Kaustav, et al., "Anomaly Pattern Detection in Categorical Datasets", KDD, (2008), 169-176.

(Continued)

*Primary Examiner* — William B Partridge
*Assistant Examiner* — Maher N Algibhah
(74) *Attorney, Agent, or Firm* — Schwegman Lundberg & Woessner, P.A.

(57) ABSTRACT

Techniques for implementing unsupervised universal anomaly detection for situation handling are disclosed. In some example embodiments, a computer-implemented method comprises detecting an anomaly in a new data point that has corresponding manifestation values for variable categories based on a restriction index for the corresponding manifestation value for at least one of the variable categories in the new data point, and causing a notification of the anomaly in the new data point to be displayed on a computing device based on the detecting of the anomaly. The restriction index for the corresponding manifestation value for the at least one of the variable categories in the new data point may be calculated for the corresponding manifestation value for each other variable category in the plurality of variable categories based on a manifestation space value and a prediction space value that are based on historical data points.

20 Claims, 11 Drawing Sheets

(56) References Cited

U.S. PATENT DOCUMENTS

| | | | |
|---|---|---|---|
| 2016/0321599 A1* | 11/2016 | Baughman | G06Q 10/06375 |
| 2016/0328654 A1 | 11/2016 | Bauer et al. | |
| 2018/0248903 A1 | 8/2018 | Villella et al. | |
| 2018/0259678 A1* | 9/2018 | Du | G01W 1/18 |
| 2018/0357292 A1 | 12/2018 | Rai et al. | |
| 2018/0357556 A1 | 12/2018 | Rai et al. | |
| 2019/0081969 A1 | 3/2019 | Phadke et al. | |
| 2020/0380571 A1* | 12/2020 | Ramakrishnan | G06N 20/00 |

FOREIGN PATENT DOCUMENTS

| | | | | |
|---|---|---|---|---|
| CN | 111798274 B | * | 1/2022 | G06N 3/0454 |
| GB | 2541649 A | | 3/2017 | |

OTHER PUBLICATIONS

Gogoi, Prasanta, et al., "Anomaly Detection Analysis of Intrusion Data Using Supervised & Unsupervised Approach", Journal of Convergence Information Technology, vol. 5, No. 1, (2010), 95-110.

* cited by examiner

| PURCHASE ORDER # | FACTORY | MATERIAL | MATERIAL GROUP | QUANTITY | UNIT |
|---|---|---|---|---|---|
| 1 | WALLDORF | COPY PAPER | OFFICE SUPPLIES | 5,000 | PCS |
| 2 | STUTTGART | TURBO-CHARGER | ENGINE PARTS | 800 | PCS |
| 3 | MUNICH | BOTTLED BEER | DINING SUPPLIES | 12,000 | PCS |
| 4 | WALLDORF | COPY PAPER | OFFICE SUPPLIES | 10 | BOX |

FIG. 4A

| VARIABLE CATEGORY 'FACTORY'<br>MANIFESTATION VALUE 'WALDORF' COINCIDES WITH | FREQUENCY COUNT |
|---|---|
| VARIABLE CATEGORY 'MATERIAL', MANIFESTATION VALUE 'COPY PAPER' | 2 |
| VARIABLE CATEGORY 'MATERIAL', MANIFESTATION VALUE 'TURBO-CHARGER' | 0 |
| VARIABLE CATEGORY 'MATERIAL', MANIFESTATION VALUE 'BOTTLED BEER' | 0 |
| VARIABLE CATEGORY 'MATERIAL GROUP', MANIFESTATION VALUE 'OFFICE SUPPLIES' | 2 |
| VARIABLE CATEGORY 'MATERIAL GROUP', MANIFESTATION VALUE 'ENGINE PARTS' | 0 |
| VARIABLE CATEGORY 'MATERIAL GROUP', MANIFESTATION VALUE 'DINING SUPPLIES' | 0 |
| . . . | . . . |
| VARIABLE CATEGORY 'FACTORY'<br>MANIFESTATION VALUE 'STUTTGART' COINCIDES WITH | FREQUENCY COUNT |
| VARIABLE CATEGORY 'MATERIAL', MANIFESTATION VALUE 'COPY PAPER' | 0 |
| . . . | . . . |

PURCHASE ORDERS

| PURCHASE ORDER # | FACTORY | MATERIAL | MATERIAL GROUP | QUANTITY | UNIT |
|---|---|---|---|---|---|
| 1 | WALLDORF | COPY PAPER | OFFICE SUPPLIES | 5,000 | PCS |
| 2 | STUTTGART | TURBO-CHARGER | ENGINE PARTS | 800 | PCS |
| 3 | MUNICH | BOTTLED BEER | DINING SUPPLIES | 12,000 | PCS |
| 4 | WALLDORF | COPY PAPER | OFFICE SUPPLIES | 5,000 | BOX |

*FIG. 6A*

PURCHASE ORDERS

| PURCHASE ORDER # | FACTORY | MATERIAL | MATERIAL GROUP | QUANTITY | UNIT |
|---|---|---|---|---|---|
| 1 | WALLDORF | COPY PAPER | OFFICE SUPPLIES | 5,000 | PCS |
| 2 | STUTTGART | TURBO-CHARGER | ENGINE PARTS | 800 | PCS |
| 3 | MUNICH | BOTTLED BEER | DINING SUPPLIES | 12,000 | PCS |
| 4 | WALLDORF | COPY PAPER | OFFICE SUPPLIES | 5,000 | PCS |

FIG. 6C

UNSUPERVISED UNIVERSAL ANOMALY DETECTION FOR SITUATION HANDLING

TECHNICAL FIELD

The present application relates generally to the technical field of electrical computer systems, and, in various embodiments, to systems and methods of implementing unsupervised universal anomaly detection for situation handling.

BACKGROUND

Current anomaly detection solutions suffer from several technical problems, such as excessive consumption of electronic resources, a dependence on supervision in their implementation, and a lack of universal compatibility and applicability to any context in which they may be deployed. For example, anomaly detection solutions that use neural networks require a significant amount of computational power and are limited to the context of the training data that was used to train the neural network models. Additionally, current rule-based anomaly detection solutions require frequent rule maintenance in order to cope with changing patterns in data and maintain high sensitivity and specificity. Furthermore, it is impossible to foresee every type of possible error that could occur over time, which means that current rule-based solutions can only be applied once an actual error has occurred and caught the attention of a user, which is often not quick enough to avoid damage associated with the error. The present disclosure addresses these and other technical problems.

BRIEF DESCRIPTION OF THE DRAWINGS

Some example embodiments of the present disclosure are illustrated by way of example and not limitation in the figures of the accompanying drawings, in which like reference numbers indicate similar elements.

FIG. 4A-4B illustrate generating at least one contingency table from a dataset comprising a plurality of historical data points, in accordance with some example embodiments.

FIGS. 6A-6C illustrate a graphical user interface (GUI) used to display a notification of an anomaly in a new data point, in accordance with some example embodiments.

DETAILED DESCRIPTION

Example methods and systems for implementing unsupervised universal anomaly detection for situation handling are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is specially-configured to implement unsupervised universally-applicable anomaly detection by inferring its own ruleset from historical data points data in an unsupervised fashion, while maintaining and further improving its accuracy by dynamically implementing user reaction to notifications of anomalies detected by the computer system to fine tune the sensitivity of the anomaly detection by the computer system. As a result, the specially-configured computer system does not require the significant amount of computational power required by other anomaly detection systems and the anomaly detection implemented by the specially-configured computer system may be universally applied to any context without significant configuration and optimization that is specific to the particular context. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
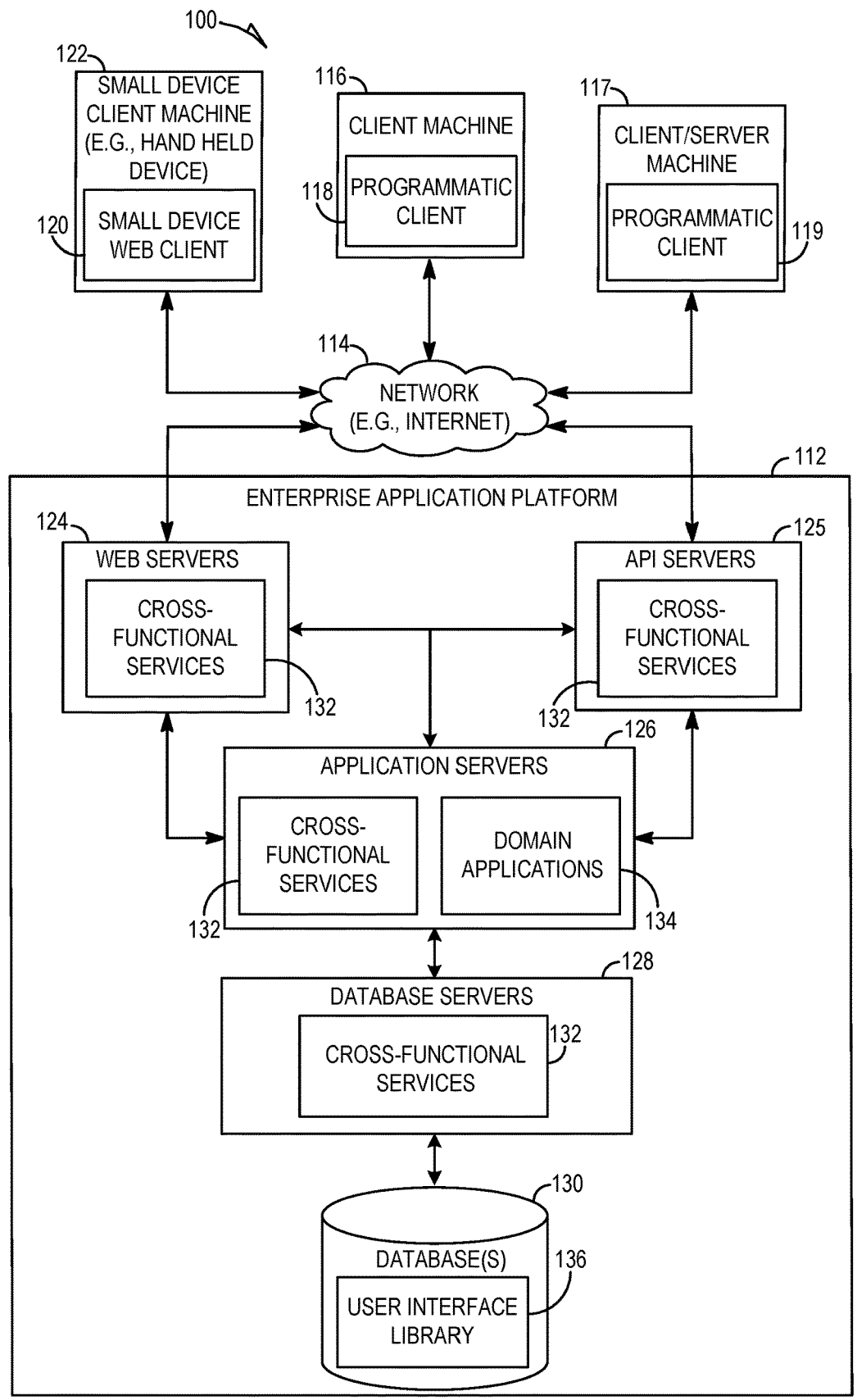
FIG. 1 is a network diagram illustrating a system, in accordance with some example embodiments.

FIG. 1 is a network diagram illustrating a system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-7.

Figure 2:
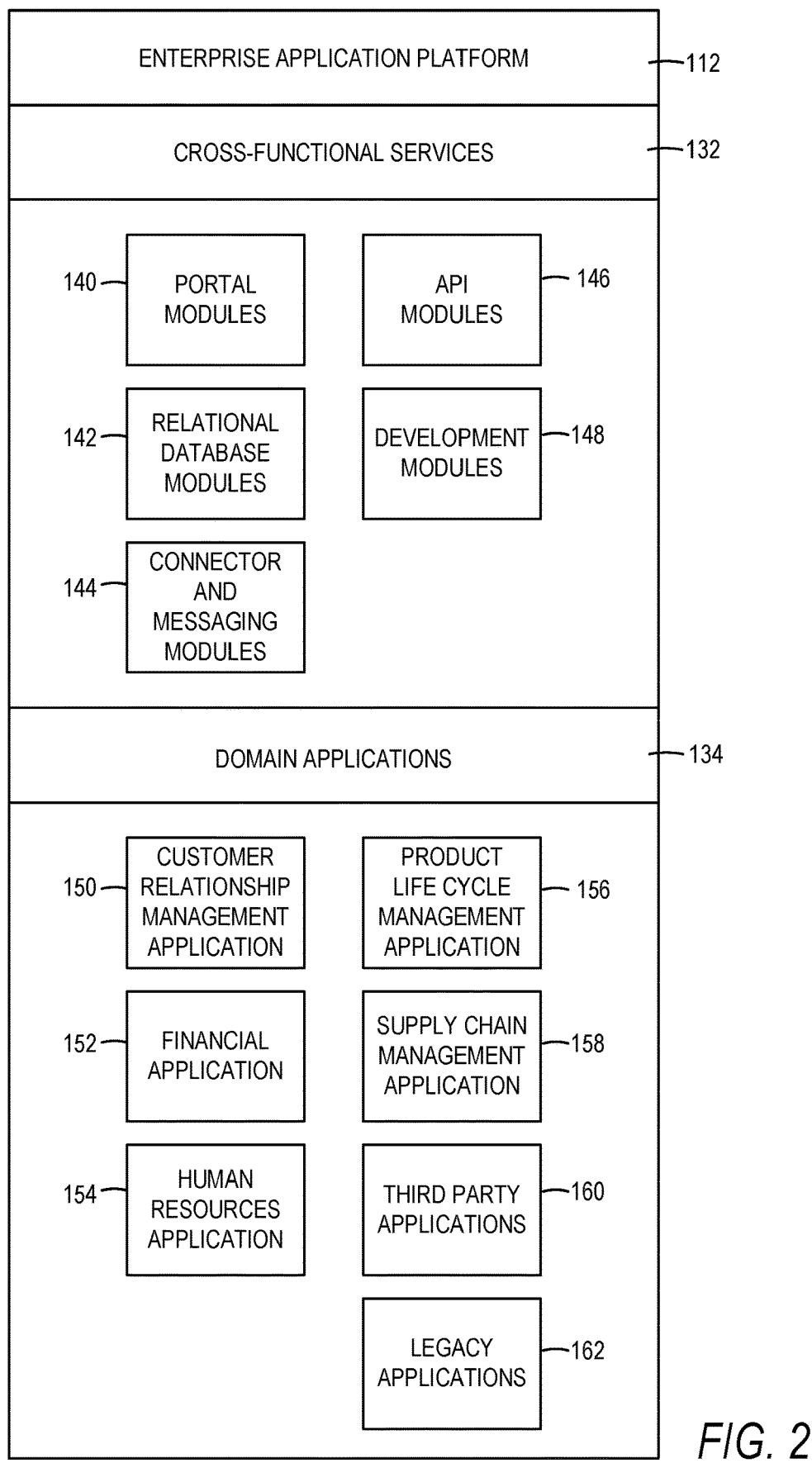
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT®.NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
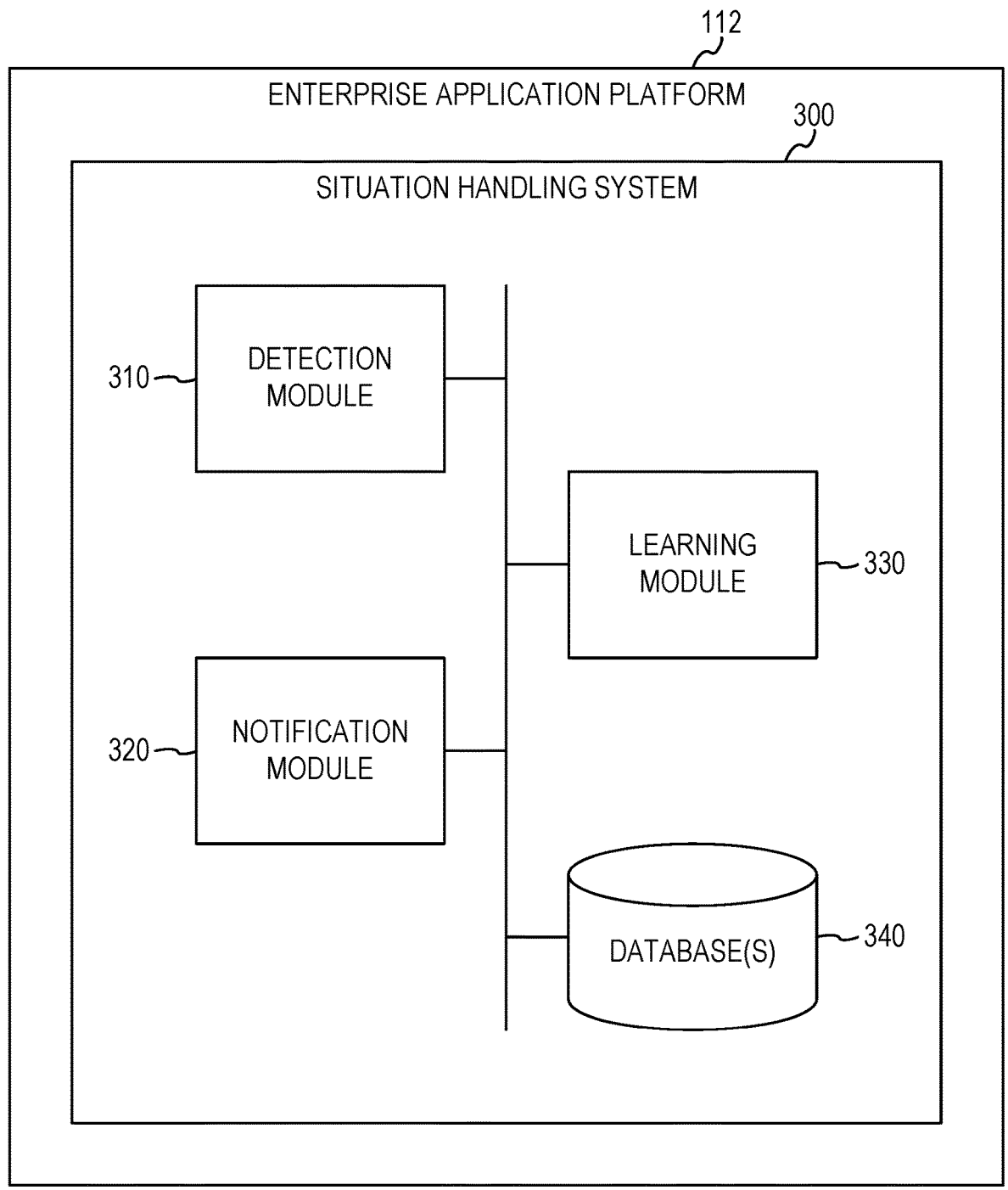
FIG. 3 is a block diagram illustrating components of a situation handling system, in accordance with some example embodiments.

FIG. 3 is a block diagram illustrating components of a situation handling system 300, in accordance with some example embodiments. In some embodiments, the situation handling system 300 comprises any combination of one or more of a detection module 310, a notification module 320, a learning module 330, and one or more database(s) 340. The detection module 310, a notification module 320, a learning module 330, and the database(s) 340 can reside on a computer system, or other machine, having a memory and at least one processor (not shown). In some embodiments, the detection module 310, a notification module 320, a learning module 330, and the database(s) 340 are incorporated into the enterprise application platform 112 in FIGS. 1 and 2. However, it is contemplated that other configurations of the detection module 310, a notification module 320, a learning module 330, and the database(s) 340 are also within the scope of the present disclosure.

In some example embodiments, one or more of the detection module 310, a notification module 320, a learning module 330 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the detection module 310, a notification module 320, a learning module 330 are configured to receive user input. For example, one or more of the detection module 310, a notification module 320, a learning module 330 can present one or more graphical user interface (GUI) elements (e.g., drop-down menu, selectable buttons, text field) with which a user can submit input. In some example embodiments, one or more of the detection module 310, a notification module 320, a learning module 330 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the situation handling system 300 is configured to bring certain situations to the attention of a user or a group of users. The situation handling system 300 may provide notification of a situation, along with a status of the situation (e.g., Open, Resolved, Obsolete, Invalid), contextual information relating to the object pertaining to the situation, and, lastly, any actions deemed relevant to address the situation. The situation handling system 300 may provide an explanation of the situation, as well as instructions on how to proceed with the situation. Examples of situations include, but are not limited to, a deadline is nearing, an open task needs working, a demand for a product has deviated, a shift in turnover rate, and a threshold has been reached. Notification of situations may be provided using one or more techniques, including, but not limited to, a notification displayed on a page of an online service and an e-mail notification.

Throughout numerous use cases, the situation handling system 300 enables users to stay on top of a constant influx of processes to be checked and actions to be taken. In order to provide an even more reliable assistant for users, the situation handling system 300 improves automatic error detection capabilities of prior solutions in various transaction types, which are situation constituents. As filters of prior solutions are specific to particular use cases and often user-specific, the same single configuration of filters cannot be deployed for every user. Rather, such prior solutions require every user to first acquire insights about the possible causes of errors before implementing their own customized solution, which consumes a considerable amount of time and limits a software solution's out-of-the-box efficiency and value. Such prior solutions also involve rule maintenance and adaptation that have to be performed manually and frequently in order to cope with changing patterns in the data and maintain high sensitivity and specificity. Additionally, it is impossible to foresee every type of possible error which could occur over time, which implies that certain solutions can only be applied once an actual error has occurred and caught a user's attention, possibly after the damage has already been dealt.

The situation handling system 300 employs features to overcome, among other technical problems, the deficiencies of rule-based, manually-employed anomaly detectors to implement a generic anomaly detector, capable of inferring its own ruleset from available data in an unsupervised fashion, while maintaining and further improving its accuracy by dynamically implementing user feedback. The term 'generic' is used herein to describe the anomaly detector implemented by the situation handling system 300 in order to refer to its independence from predefined rules or data-specific thresholds, and is specifically not used to mean that any of the features of the anomaly detector disclosed herein are conventional or well-known. Rather, the term 'generic' refers to the fact that the anomaly detector implemented by the situation handling system 300 provides universal applicability and compatibility to any context in which it is used, thereby not requiring any specific training or configuration for any particular context. Furthermore, the features of the situation handling system 300 enable the anomaly detector of the situation handling system 300 to operate at an effective ratio of correct and false positives based on a rather small given historical dataset. Additionally, the situation handling system 300 is able to provide effective anomaly detection for numerical and non-numerical data alike without the need for explicit declarations of level of measurement in the data.

In some example embodiments, the detection module 310 is configured to detect an anomaly in a new data point based on an algorithm that uses historical data points of a historical dataset to build a dictionary for analyzing new data points without the need for any explicit declarations of level of measurement in the historical or new data points. The algorithm for detection may include computing contingency tables for a given historical dataset, computing restriction indices or indexes for every combination of two manifestations—a predictor variable and its dependent variable—in a given new data point, ranking every prediction for the new data point based on restriction indices and prediction weights of every predictor variable for every dependent variable in the new data point, computing a degree of deviation between a given manifestation and prediction based on a cumulative relative restriction index of the prediction rank, and computing a score of extraordinariness of the entire new data point based on an average cumulative relative degrees of deviation of all contained manifestations. The restriction index measures the predictor manifestation's proportion of the entire dataset, and the prediction weight measures the dependent variable's proportion that overlaps with the predictor manifestation. The score of extraordinariness may be used to determine whether an anomaly that is worthy of notification is present in the new data point, such as based on the score of extraordinariness satisfying a minimum threshold value.

In some example embodiments, the detection module 310 is configured to generate at least one contingency table based on a plurality of historical data points. The historical data points may be stored in the database(s) 340, and the detection module 310 may access the database(s) 340 to obtain the historical data points. FIG. 4A-4B illustrate generating at least one contingency table 420 from a dataset 410 comprising a plurality of historical data points 412, in accordance with some example embodiments. As seen in FIG. 4A, the plurality of historical data points 412 may comprise a plurality of purchase orders. For example, in FIG. 4A, a first historical data point 412-1 corresponds to a first purchase order (e.g., purchase order #1), a second historical data point 412-2 corresponds to a second purchase order (e.g., purchase order #2), a third historical data point 412-3 corresponds to a third purchase order (e.g., purchase order #3), and a fourth historical data point 412-4 corresponds to a fourth purchase order (e.g., purchase order #4). Other types of historical data points 412 are also within the scope of the present disclosure.

In some example embodiments, each one of the plurality of historical data points 412 has a corresponding manifestation value for each one of a plurality of variable categories. In FIG. 4A, the historical data points 412 have corresponding manifestation values for the variable categories of a factory corresponding to (e.g., listed in) the purchase order of the historical data point 412, a material corresponding to (e.g., listed in) the purchase order of the historical data point 412, a material group corresponding to (e.g., listed in) the purchase order of the historical data point 412, a quantity corresponding to (e.g., listed in) the purchase order of the historical data point 412, and a unit corresponding to (e.g., listed in) the purchase order of the historical data point 412. For example, the first purchase order of the historical data point 412-1 has a manifestation value of "WALLDORF" for the variable category of "FACTORY," a manifestation value of "COPY PAPER" for the variable category of "MATERIAL," a manifestation value of "OFFICE SUPPLIES" for the variable category of "MATERIAL GROUP," a manifestation value of "5,000" for the variable category of "QUANTITY," and a manifestation value of "PCS" for the variable category of "UNIT." Other manifestation values and variable categories are within the scope of the present disclosure.

As seen in FIG. 4A, the corresponding manifestation values for the variable categories may comprise a non-numerical value (e.g., a text-based value), such as a categorical variable value. A categorical variable is a variable that can take on one of a limited, and usually fixed, number of possible values, assigning each individual or other unit of observation to a particular group or nominal category on the basis of some qualitative property. The corresponding manifestation values for the variable categories may additionally or alternatively comprise numerical values.

FIG. 4B shows the contingency table(s) 420 generated based on the historical data points 412. The contingency table(s) 420 may contain the frequencies of how often a manifestation of a given variable coincides with every manifestation of every other given variable in the historical dataset 410. In some example embodiments, the contingency table(s) 420 comprise, for each one of the manifestation values for each one of the plurality of variable categories, a corresponding number of times the manifestation value for the variable category coincides with each manifestation value of each other variable category of the plurality of variable categories in the plurality of historical data points.

In some example embodiments, the detection module 310 is configured to calculate a restriction index. The restriction index is a quantitative indicator to estimate the predictive power that a specific manifestation of a variable (predictor) has over the manifestation of another dependent variable. The restriction index restricts the degrees of freedom in the prediction of the dependent variable.

The restriction index may be calculated based on a manifestation space value and a prediction space value. The manifestation space value corresponds to the space containing every historical manifestation of the dependent variable, whereas the prediction space value corresponds to the space containing those manifestations of the dependent variable that a given predictor manifestation predicts based on the historical dataset 410.

In one example where a new data point has a given manifestation of the variable category as FACTORY as STUTTGART and you want to predict the manifestation of another dependent variable category MATERIAL in the new data point, STUTTGART would allow you to assume the manifestation of MATERIAL that most frequently appears in the prediction space of STUTTGART over MATERIAL. The possible manifestations of MATERIAL are thus restricted within the boundaries of the prediction space of the manifestation of FACTORY. As the restriction index of a predictor manifestation gets bigger, the more frequently the predictor manifestation appears within the historical dataset 410, resulting in the logical assumption that a predictor is of greater predictive value the greater the proportion of the dependent variable space is with which it overlaps. Thus, the restriction index serves as a confidence measure for how likely a prediction will be true based on the given historical dataset 410.

In some example embodiments, the detection module 310 is configured to, for each one of the manifestation values for each one of the plurality of variable categories, calculate a corresponding restriction index for each manifestation value for each other variable category in the plurality of variable categories based on a manifestation space value and a prediction space value using the contingency table(s) 420. The manifestation space value may comprise a number of different manifestation values for the other variable category in the plurality of historical data points 412, and the prediction space value may comprise a number of different manifestation values for the other variable category coinciding with the manifestation value for the variable category in the plurality of historical data points 412.

In some example embodiments, the restriction index (RI) is calculated using the following equation:

$$RI = \frac{n}{m},$$

where m is the size of the manifestation space of the dependent variable, and n is the size of the prediction space of the predictor manifestation over m.

In some example embodiments, the restriction index comprises the following properties:
- always lies between 0 and 1, the closer it is to 1, the higher the weight of this specific manifestation's prediction; and
- works for m>n; special case is m=n=1, in which case the restriction index cannot be computed, which is unnecessary, because the prediction is trivial in this case.

Figure 5:
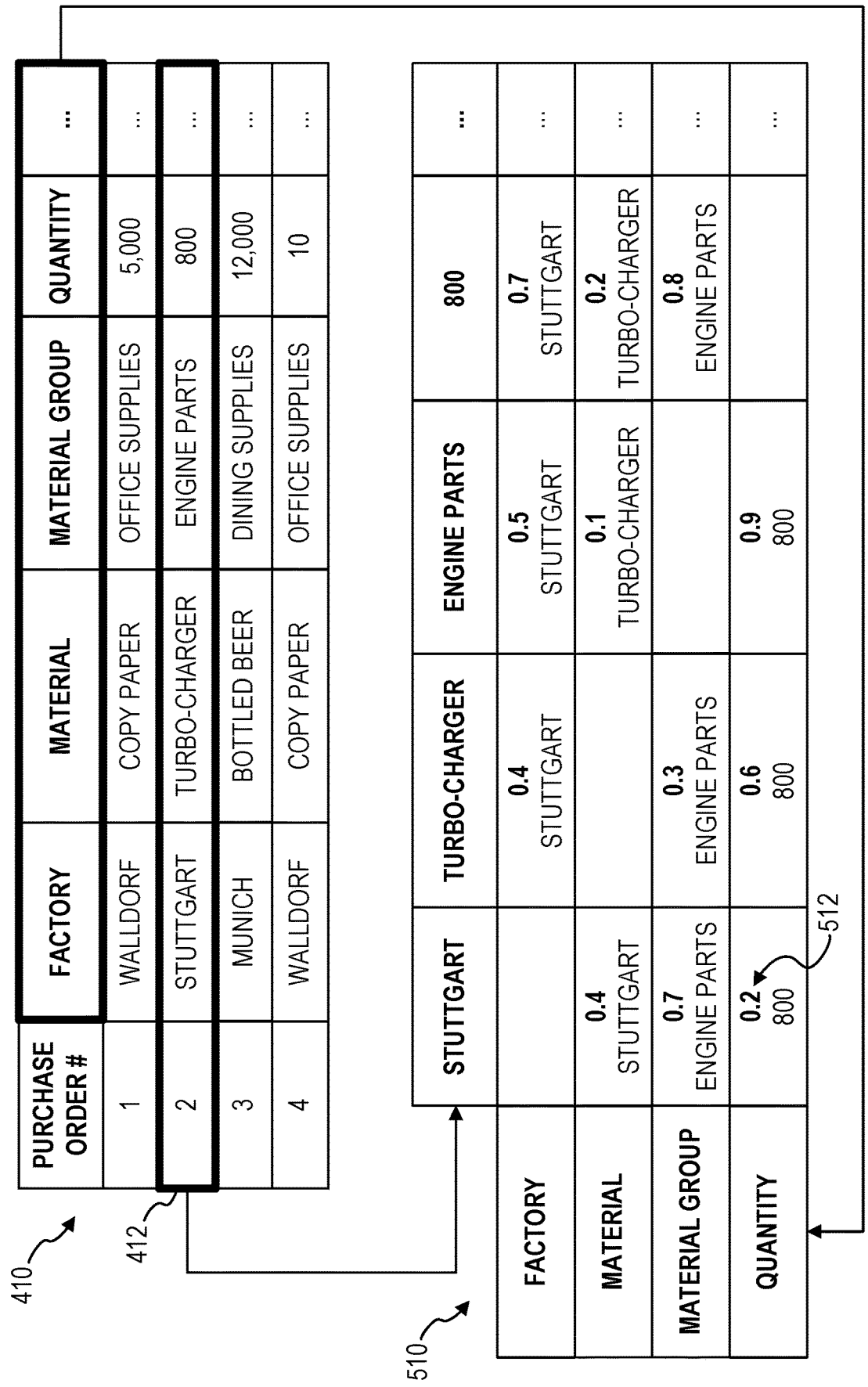
FIG. 5 illustrates a table of restriction indexes calculated using a plurality of historical data points, in accordance with some example embodiments.

FIG. 5 illustrates a table 510 of restriction indexes 512 calculated using a plurality of historical data points 412, in accordance with some example embodiments. The table 510 shows the restriction indices with the according prediction, computed for every manifestation in the data point 412 over every other variable in the data point 412 based on the dataset 410. For example, if the variable FACTORY has the manifestation STUTTGART, then this manifestation has a restriction index of 0.4 over MATERIAL and predicts MATERIAL to be TURBO-CHARGER because it is the most frequently ordered material from the factory in Stuttgart.

In some example embodiments, the detection module 310 is configured to detect an anomaly in a new data point (e.g., a data point that is not included in the plurality of historical data points) that has a corresponding manifestation value for each one of the plurality of variable categories based on the restriction index for the corresponding manifestation value for at least one of the plurality of variable categories in the new data point, at operation 730.

In detecting the anomaly in the new data point based on the restriction index, the detection module 310 may rank every prediction based on the restriction indices of every predictor for every dependent variable in a given new data point. Every manifestation makes a prediction for every other variable in a data point. This prediction is part of the prediction space n. Specifically, it is the manifestation in n that accounts for the single largest proportion of n based on every manifestation's frequency. This proportion may form a prediction weight, which lies between 0 and 1. In determining which variable's manifestation is the most meaningful for the prediction of another variable's manifestation, the detection module 310 may rank the predictions for a specific variable's manifestation by the predictor's manifestation's restriction index. To also include the information about how large a proportion of n is accounted for by a given prediction, the prediction weight may be added to the restriction index value. The resulting prediction score lies between 0 and 2 and may be used as the final ranking criterium for all predictions made for the manifestation of a given variable.

When the final ranking of predictions for every variable has been computed, the detection module 310 may compare it with the manifestation that is given in the actual new data point. Ideally, it equals the most likely prediction (e.g., the one with the highest prediction score). If that is not the case, it is compared with the prediction with the next lower score, until a prediction within the ranking matches the given manifestation.

The prediction score of the matching prediction is then summed up with every other prediction score down the ranking. This sum is then set into relation to the sum of all prediction scores in the ranking, and subtracted from one. Thus, the resulting degree of deviation will again lie between 0 and 1, where 1 equals maximum extraordinariness of the given manifestation, and zero means the manifestation equals the most likely prediction and is thus a very ordinary manifestation. The following equation may be used to calculate the degree of deviation:

$$\text{Degree of Deviation} = 1 - \left( \frac{\left( \frac{\text{within\_group}_{sum(p\_scores_{match\ and\ lower})}}{\text{within\_group}_{sum(p\_scores_{all})}} \right) + \left( \frac{\text{between\_group}_{sum(p\_scores_{match\ and\ lower})}}{\text{between\_group}_{sum(p\_score_{all})}} \right)}{2} \right),$$

where group refers to the dataset being divided into groups by predictor manifestations (e.g., one group per predictor manifestation), and p_scores refers to the prediction scores, where each prediction score is equal to the sum of the corresponding restriction index and prediction weight. Groups are ranked by each group's sum of prediction scores it contains set into relation to the total sum of all prediction scores in the dataset, which gives the between_group term. Within each group, the prediction score of the manifestations that matches the manifestation in the datapoint to be diagnosed and the prediction scores of the lower-ranked manifestations within that group are summed up and set into relation to the group's sum of prediction scores, which gives the within_group term.

In some example embodiments, the detection module 310 is configured to calculate a score of extraordinariness of an entire given new data point, based on average cumulative relative degrees of deviation of all contained manifestations. The detection module 310 may calculate degrees of deviation for every manifestation in a given data point. To evaluate how extraordinary an entire data point is, the detection module 310 may compare the degree of deviation value of every manifestation against the historic mean degree of deviation and its standard deviation for that variable. For a given new data point, every manifestation's distance (measured in standard deviation units) from the mean of its history may be used to compute an average of distances for this data point, which is again compared to the historic average distances of all data points, resulting in a score of extraordinariness for a new data point. The detection module 310 may determine that an anomaly exists in a new data point based on a determination that the calculated score of extraordinariness is equal to or greater than a minimum threshold value stored in the database(s) 340.

In some example embodiments, the detecting of the anomaly in the new data point is performed in response to, or otherwise based on, receiving a request from a computing device of a user to display the new data point. Alternatively, the detection module 310 may detect the anomaly in the new data point prior to receiving any request from the computing device to display the new data point. For example, the detection module 310 may perform the detecting of the anomaly in the new data point in response to the new data point being added to the database(s) 340.

Figure 6B:
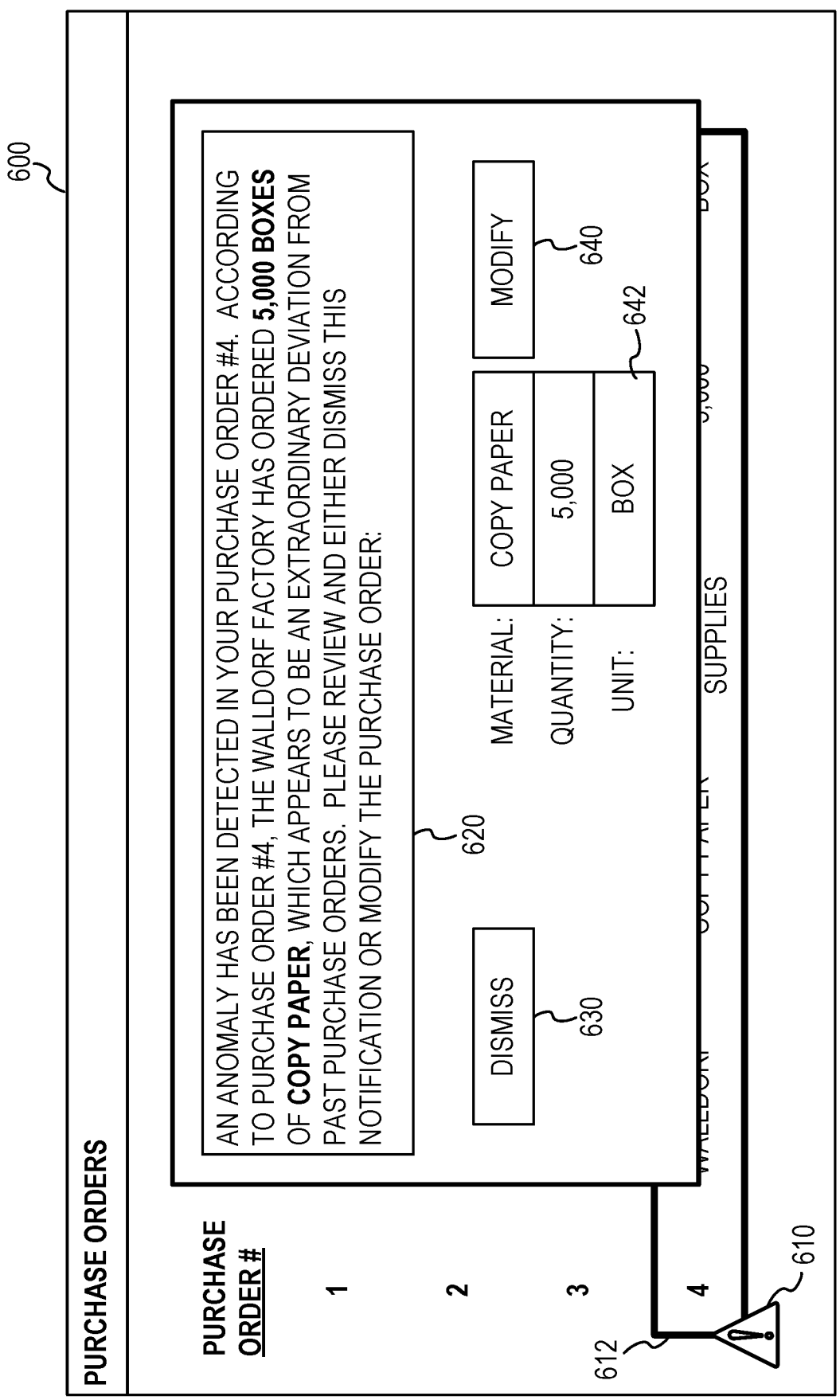

In some example embodiments, the notification module 320 is configured to cause a notification of the anomaly in the new data point to be displayed on a computing device based on the detecting of the anomaly by the detection module 310. FIGS. 6A-6C illustrate a GUI 600 used to display a notification of an anomaly in a new data point, in accordance with some example embodiments. In FIG. 6A, the GUI 600 displays a dataset of new data points with one new data point 612 in the dataset being highlighted (e.g., outlined). Based on the detection of an anomaly in the new data point 612 by the detection module 310, the notification module 320 may cause an indication 610 (e.g., an icon) that there is an anomaly in the new data point 612. The indication 610 may be configured to trigger a display of a notification of the anomaly in response to its selection by a user viewing the GUI via a computing device. In FIG. 6B, in response to the user clicking on the indication 610, the notification module 320 has caused a notification 620 of the detected anomaly to be displayed in the GUI 600. The notification 620 of the anomaly in the new data point 612 may be displayed concurrently with the new data point 612 within the GUI 600. For example, the notification 620 of the anomaly may be displayed overlaying a user interface area in which the new data point 612 is being displayed.

In some example embodiments, the notification module 320 may cause one or more user interface elements configured to enable the user to store a modification to the new data point 612 in the database(s) 340. For example, the notification module 320 may display the anomalous data in the new data point 612 in one or more fields 642. The fields 642 may be configured to receive user input, such that the user can modify the values of the new data point 612 by replacing a current value in the field 642 for the new data point 612 with an updated value in the field 642. The notification module 320 may also display a selectable user interface element 640 configured to trigger the situation handling system 300 to store the user-entered modification in the field(s) 642 for the new data point 612 in the database(s) 340. In FIG. 6C, the user has corrected the purchase order of the new data point 612 by replacing boxes (BOX) with pieces (PCS) as the unit (UNIT) for the purchase order and clicked the user interface element 640 to implement this modification, and the stored modification is reflected in the purchase order of the data point 412 when the notification 620 is removed in response to the selection of the user interface element 640.

In some example embodiments, the learning module 330 is configured to use information about how the user of the computing device reacts to viewing the notification of the anomaly in the new data point to adjust the way in which the detection module 310 subsequently detects anomalies in subsequent data points. For example, the detecting of the anomaly in the new data point 612 may comprise calculating a score (e.g., the score of extraordinariness previously discussed above) for the new data point 612 based on the corresponding restriction index for the corresponding manifestation value for each one of the plurality of variable categories in the new data point 612. In this example, the anomaly is detected based on a determination that the calculated score is equal to or greater than a minimum threshold value stored in the database(s) 340. Detection thresholds may also be learned and implicitly user-adapted for each combination of predictor manifestation and dependent variable manifestation. The situation learning module 330 may use a lack of modifications of new data points 412 by users in response to the users viewing the notifications 620 of anomalies in the new data points 412 as an indication that the detection module 310 is too sensitive in its detection of anomalies, such as due to the minimum threshold value being too low. In some example embodiments, the learning module 330 modifies the minimum threshold value based on these indications, such as by increasing the minimum threshold value that is used for detection.

In order to implement the dynamic adjustment of the minimum threshold value discussed above, the learning module 330 determines that a user of the computing device has dismissed the notification 620 without modifying the new data point 612 in the database. For example, referring back to FIG. 6B, the notification module 320 may display a selectable user interface element 630 (e.g., a selectable "DISMISS" button) that is configured to, in response to its selection by the user, trigger a dismissal of the notification 620 of the anomaly without any modification to the new data point 612 being implemented in the database(s) 340. The situation handling system 300 may store an indication of the user selection of the selectable user interface element 630 in FIG. 6B. Since the user selection of the selectable user interface element 630 triggers the dismissal of the notification 620 of the anomaly without any modification to the new data point 612 being implemented in the database(s) 340, the learning module 330 may use the stored indication of this dismissal as a basis for determining that the user of the computing device has dismissed the notification 620 without modifying the new data point 612 in the database(s) 340.

In some example embodiments, in response to or otherwise based on the determination that the user of the computing device has dismissed the notification 620 without modifying the new data point 612 in the database(s) 340, the learning module 330 increases the minimum threshold value stored in the database(s) 340. The learning module 330 may use a dismissal criteria that includes a plurality of determinations of notification dismissal in order to determine whether to increase the minimum threshold value stored in the database(s) 340. For example, the dismissal criteria may require that a predetermined number or a predetermined percentage of different notifications 620 of different anomalies be dismissed over a predetermined period of time or over a predetermined total number of different notifications 620 in order to increase the minimum threshold value stored in the database(s) 340. After the minimum threshold value stored in the database(s) 340 is increased, the detection module 320 may use the increased minimum threshold value stored in the database(s) 340 in detecting other anomalies of other new data points 612.

Figure 7:
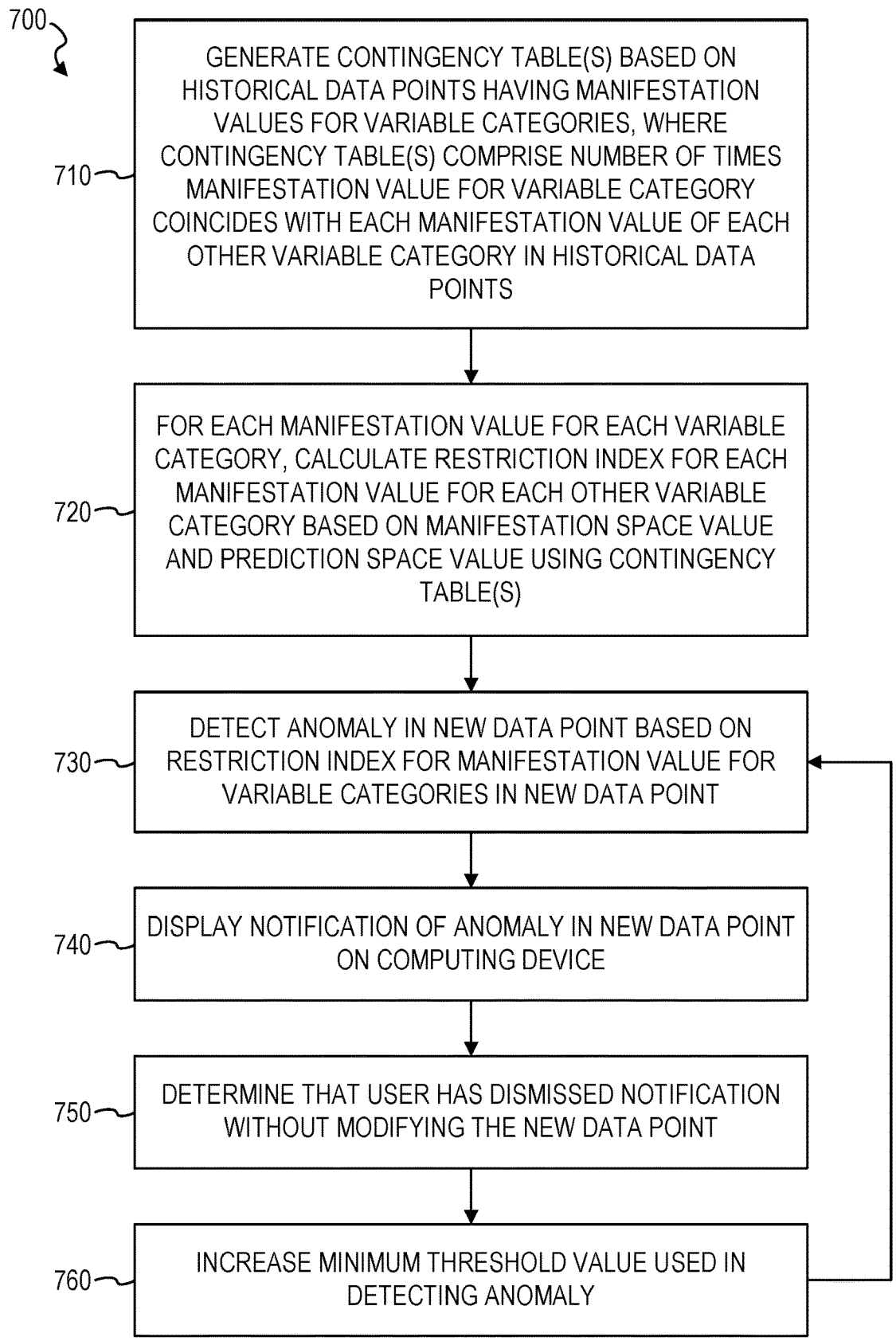
FIG. 7 is a flowchart illustrating a method of implementing unsupervised universal anomaly detection for situation handling, in accordance with some example embodiments.

FIG. 7 is a flowchart illustrating a method 700 of implementing unsupervised universal anomaly detection for situation handling, in accordance with some example embodiments. The method 700 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 700 are performed by the situation handling system 300 of FIG. 3, as described above.

At operation 710, the situation handling system 300 generates at least one contingency table based on a plurality of historical data points. In some example embodiments, each one of the plurality of historical data points has a corresponding manifestation value for each one of a plurality of variable categories. The contingency table(s) may comprise, for each one of the manifestation values for each one of the plurality of variable categories, a corresponding number of times the manifestation value for the variable category coincides with each manifestation value of each other variable category of the plurality of variable categories in the plurality of historical data points. The corresponding manifestation value for each one of a plurality of variable categories may comprise a non-numerical value, such as a categorical variable value. However, the corresponding manifestation value for one or more of the plurality of variable categories may alternatively comprise a numerical value. The plurality of historical data points may comprise a plurality of purchase orders. However, other types of historical data points are also within the scope of the present disclosure.

Thereafter, at operation 720, the situation handling system 300, for each one of the manifestation values for each one of the plurality of variable categories, calculates a corresponding restriction index for each manifestation value for each other variable category in the plurality of variable categories based on a manifestation space value and a prediction space value using the contingency table(s). In some example embodiments, the manifestation space value comprises a number of different manifestation values for the other variable category in the plurality of historical data points, and the predication space value comprises a number of different manifestation values for the other variable category coinciding with the manifestation value for the variable category in the plurality of historical data points.

The situation handling system 300 detects an anomaly in a new data point (e.g., a data point that is not included in the plurality of historical data points) that has a corresponding manifestation value for each one of the plurality of variable categories based on the restriction index for the corresponding manifestation value for at least one of the plurality of variable categories in the new data point, at operation 730. In some example embodiments, the detecting of the anomaly in the new data point is performed in response to, or otherwise based on, receiving a request from a computing device of a user to display the new data point. Alternatively, the situation handling system 300 may detect the anomaly in the new data point prior to receiving any request from the computing device to display the new data point. For example, the situation handling system 300 may perform the detecting of the anomaly in the new data point in response to the new data point being added to a database.

At operation 740, the situation handling system 300 causes a notification of the anomaly in the new data point to be displayed on a computing device based on the detecting of the anomaly. In some example embodiments, the notification of the anomaly in the new data point is displayed concurrently with the new data point on the computing device. For example, the notification of the anomaly may be displayed overlaying a user interface area in which the new data point is being displayed. In some example embodiments, the causing the notification of the anomaly in the new data point to be displayed comprises causing at least one user interface element to be displayed on the computing device in association with the notification of the anomaly in the new data point. The user interface element(s) may be configured to store a modification to the new data point in a database based on input from a user of the computing device, such as previously described above with respect to FIGS. 6A-6C.

In some example embodiments, the situation handling system 300 uses information about how the user of the computing device reacts to viewing the notification of the anomaly in the new data point to adjust the way in which the situation handling system 300 subsequently detects anomalies in subsequent data points. For example, the detecting of the anomaly in the new data point, at operation 730, may comprise calculating a score (e.g., the score of extraordinariness previously discussed above) for the new data point based on the corresponding restriction index for the corresponding manifestation value for each one of the plurality of variable categories in the new data point. In this example, the anomaly is detected based on a determination that the calculated score is equal to or greater than a minimum threshold value stored in a database. The situation handling system 300 may use a lack of modifications of data points by users in response to the users viewing the notifications of anomalies in the data points as an indication that the situation handling system 300 is too sensitive in its detection of anomalies, such as due to the minimum threshold value being too low. In some example embodiments, the situation handling system 300 modifies the minimum threshold value based on these indications, such as by increasing the minimum threshold value that is used for detection.

In order to implement the dynamic adjustment of the minimum threshold value discussed above, at operation 750, the situation handling system 300 determines that a user of the computing device has dismissed the notification without modifying the new data point in the database. For example, the situation handling system 300 may store an indication of the user selection of the selectable user interface element 630 in FIG. 6B. Since the user selection of the selectable user interface element 620 triggers the dismissal of the notification 620 of the anomaly without any modification to the new data point being implemented in the database, the situation handling system 300 may use the stored indication of this dismissal as a basis for determining that the user of the computing device has dismissed the notification without modifying the new data point in the database.

In response to, or otherwise based on, the determination at operation 750 that the user of the computing device has dismissed the notification without modifying the new data point in the database, the situation handling system 300 increases the minimum threshold value stored in the database, at operation 760. In some example embodiments, the situation handling system 300 uses a dismissal criteria that includes a plurality of determinations of notification dismissal at operation 750 in order to determine whether to increase the minimum threshold value stored in the database. For example, the dismissal criteria may require that a predetermined number or a predetermined percentage of different notifications of different anomalies be dismissed over a predetermined period of time or over a predetermined total number of different notifications in order to increase the minimum threshold value stored in the database. After the minimum threshold value stored in the database is increased at operation 760, the method 700 may return to operation 730, where the situation handling system 300 uses the increased minimum threshold value stored in the database in detecting other anomalies is other new data points.

It is contemplated that any of the other features described within the present disclosure can be incorporated into the method 700.

The following paragraphs provide example embodiments.

Example 1 includes a computer-implemented method comprising: generating, by a computer system having at least one hardware processor, at least one contingency table based on a plurality of historical data points, each one of the plurality of historical data points having a corresponding manifestation value for each one of a plurality of variable categories, the at least one contingency table comprising, for each one of the manifestation values for each one of the plurality of variable categories, a corresponding number of times the manifestation value for the variable category coincides with each manifestation value of each other variable category of the plurality of variable categories in the plurality of historical data points; for each one of the manifestation values for each one of the plurality of variable categories, calculating, by the computer system, a corresponding restriction index for each manifestation value for each other variable category in the plurality of variable categories based on a manifestation space value and a prediction space value using the at least one contingency table, the manifestation space value comprising a number of different manifestation values for the other variable category in the plurality of historical data points, and the predication space comprising a number of different manifestation values for the other variable category coinciding with the manifestation value for the variable category in the plurality of historical data points; detecting, by the computer system, an anomaly in a new data point that is not included in the plurality of historical data points and that has a corresponding manifestation value for each one of the plurality of variable categories based on the restriction index for the corresponding manifestation value for at least one of the plurality of variable categories in the new data point; and causing, by the computer system, a notification of the anomaly in the new data point to be displayed on a computing device based on the detecting of the anomaly.

Example 2 includes the computer-implemented method of example 1, wherein the causing the notification of the anomaly in the new data point to be displayed comprises causing at least one user interface element to be displayed on the computing device in association with the notification of the anomaly in the new data point, the at least one user interface element being configured to store a modification to the new data point in a database based on input from a user of the computing device.

Example 3 includes the computer-implemented method of example 1 or example 2, wherein the detecting of the anomaly in the new data point comprises calculating a score for the new data point based on the corresponding restriction index for the corresponding manifestation value for each one of the plurality of variable categories in the new data point, the anomaly being detected based on a determination that the calculated score is equal to or greater than a minimum threshold value stored in a database, and the computer-implemented method further comprising: determining, by the computer system, that a user of the computing device has dismissed the notification without modifying the new data point in the database; increasing, by the computer system, the minimum threshold value stored in the database; and detecting, by the computer system, another anomaly in another new data point using the increased minimum threshold value stored in the database.

Example 4 includes the computer-implemented method of any one of examples 1 to 3, wherein the detecting of the anomaly in the new data point is performed in response to receiving a request from the computing device of the user to display the new data point.

Example 5 includes the computer-implemented method of any one of examples 1 to 4, wherein the notification of the anomaly in the new data point is caused to be displayed concurrently with the new data point on the computing device.

Example 6 includes the computer-implemented method of any one of examples 1 to 5, wherein the corresponding manifestation value for each one of a plurality of variable categories comprises a non-numerical value.

Example 7 includes the computer-implemented method of any one of examples 1 to 6, wherein the plurality of historical data points comprises a plurality of purchase orders.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
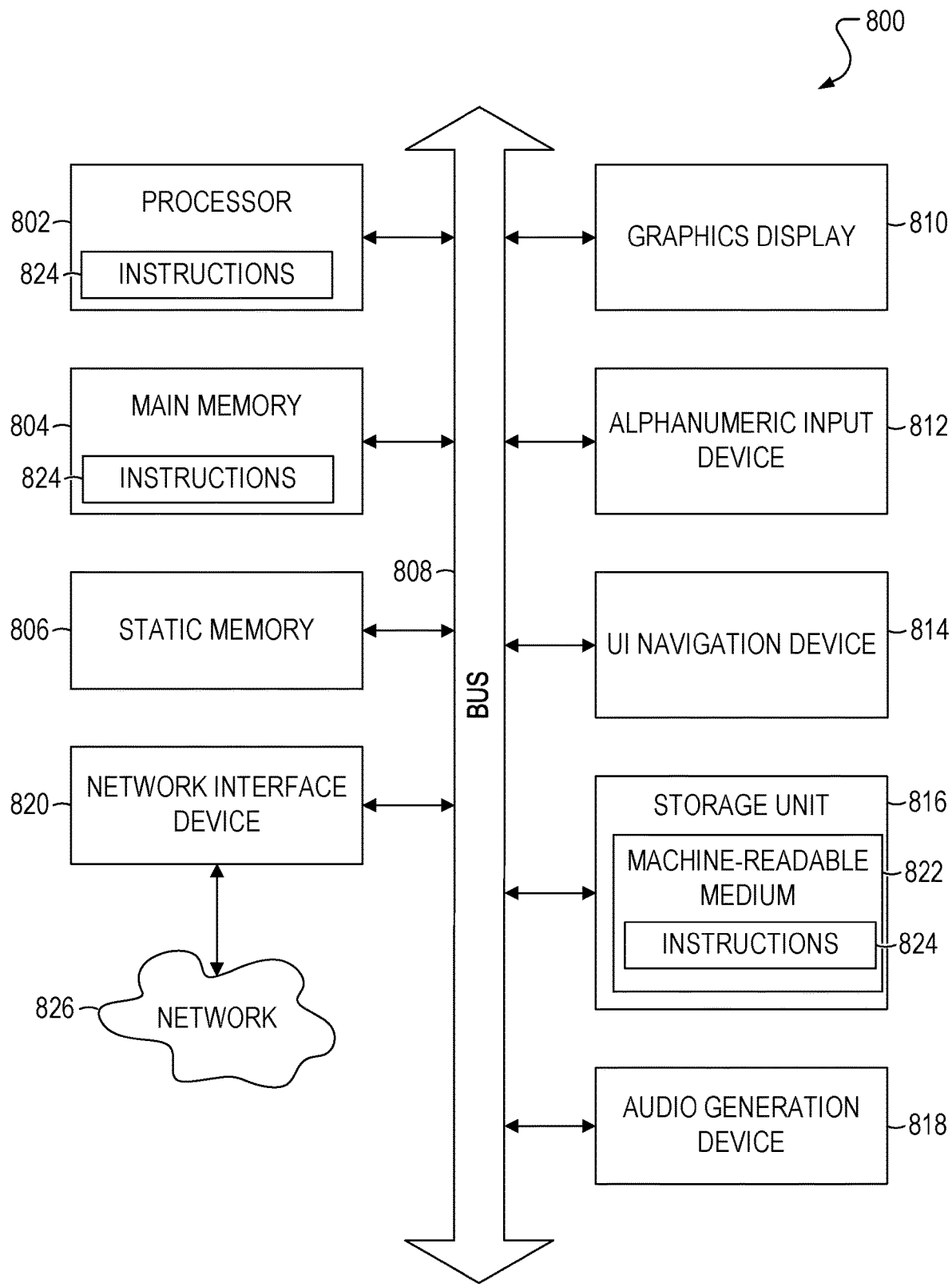
FIG. 8 is a block diagram of an example computer system on which methodologies described herein can be executed, in accordance with some example embodiments.

FIG. 8 is a block diagram of a machine in the example form of a computer system 800 within which instructions 824 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU) or both), a main memory 804, and a static memory 806, which communicate with each other via a bus 808. The computer system 800 may further include a graphics or video display unit 810 (e.g., a liquid crystal display (LCD) or a cathode ray tube (CRT)). The computer system 800 also includes an alphanumeric input device 812 (e.g., a keyboard), a user interface (UI) navigation (or cursor control) device 814 (e.g., a mouse), a storage unit (e.g., a disk drive unit) 816, an audio or signal generation device 818 (e.g., a speaker), and a network interface device 820.

The storage unit 816 includes a machine-readable medium 822 on which is stored one or more sets of data structures and instructions 824 (e.g., software) embodying or utilized by any one or more of the methodologies or functions described herein. The instructions 824 may also reside, completely or at least partially, within the main memory 804 and/or within the processor 802 during execution thereof by the computer system 800, the main memory 804 and the processor 802 also constituting machine-readable media. The instructions 824 may also reside, completely or at least partially, within the static memory 806.

While the machine-readable medium 822 is shown in an example embodiment to be a single medium, the term "machine-readable medium" may include a single medium or multiple media (e.g., a centralized or distributed database, and/or associated caches and servers) that store the one or more instructions 824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:

generating, by a computer system having at least one hardware processor, at least one contingency table based on a plurality of historical data points, each one of the plurality of historical data points having a corresponding manifestation value for each one of a plurality of variable categories, the at least one contingency table comprising, for each one of the manifestation values for each one of the plurality of variable categories, a corresponding number of times the manifestation value for the variable category coincides with each manifestation value of each other variable category of the plurality of variable categories in the plurality of historical data points;

for each one of the manifestation values for each one of the plurality of variable categories, calculating, by the computer system, a corresponding restriction index for each manifestation value for each other variable category in the plurality of variable categories based on a manifestation space value and a prediction space value using the at least one contingency table, the manifestation space value comprising a number of different manifestation values for the other variable category in the plurality of historical data points and corresponding to a first space containing every historical manifestation of a dependent variable in the plurality of historical data points, and the prediction space value comprising a number of different manifestation values for the other variable category coinciding with the manifestation value for the variable category in the plurality of historical data points and corresponding to a second space containing every historical manifestation of the dependent variable in the plurality of historical data points that a given predictor manifestation predicts;

detecting, by the computer system, an anomaly in a new data point that is not included in the plurality of historical data points and that has a corresponding manifestation value for each one of the plurality of variable categories based on the restriction index for the corresponding manifestation value for at least one of the plurality of variable categories in the new data point; and causing, by the computer system, a notification of the anomaly in the new data point to be displayed on a computing device based on the detecting of the anomaly.

2. The computer-implemented method of claim 1, wherein the causing the notification of the anomaly in the new data point to be displayed comprises causing at least one user interface element to be displayed on the computing device in association with the notification of the anomaly in the new data point, the at least one user interface element being configured to store a modification to the new data point in a database based on input from a user of the computing device.

3. The computer-implemented method of claim 1, wherein the detecting of the anomaly in the new data point comprises calculating a score for the new data point based on the corresponding restriction index for the corresponding manifestation value for each one of the plurality of variable categories in the new data point, the anomaly being detected based on a determination that the calculated score is equal to or greater than a minimum threshold value stored in a database, and the computer-implemented method further comprising:

determining, by the computer system, that a user of the computing device has dismissed the notification without modifying the new data point in the database;

increasing, by the computer system, the minimum threshold value stored in the database; and detecting, by the computer system, another anomaly in another new data point using the increased minimum threshold value stored in the database.

4. The computer-implemented method of claim 1, wherein the detecting of the anomaly in the new data point is performed in response to receiving a request from the computing device of the user to display the new data point.

5. The computer-implemented method of claim 1, wherein the notification of the anomaly in the new data point is caused to be displayed concurrently with the new data point on the computing device.

6. The computer-implemented method of claim 1, wherein the corresponding manifestation value for each one of a plurality of variable categories comprises a non-numerical value.

7. The computer-implemented method of claim 1, wherein the plurality of historical data points comprises a plurality of purchase orders.

8. A system comprising:

at least one hardware processor; and a non-transitory computer-readable medium storing executable instructions that, when executed, cause the at least one processor to perform operations comprising:

generating at least one contingency table based on a plurality of historical data points, each one of the plurality of historical data points having a corresponding manifestation value for each one of a plurality of variable categories, the at least one contingency table comprising, for each one of the manifestation values for each one of the plurality of variable categories, a corresponding number of times the manifestation value for the variable category coincides with each manifestation value of each other variable category of the plurality of variable categories in the plurality of historical data points;

for each one of the manifestation values for each one of the plurality of variable categories, calculating a corresponding restriction index for each manifestation value for each other variable category in the plurality of variable categories based on a manifestation space value and a prediction space value using the at least one contingency table, the manifestation space value comprising a number of different manifestation values for the other variable category in the plurality of historical data points and corresponding to a first space containing every historical manifestation of a dependent variable in the plurality of historical data points, and the prediction space value comprising a number of different manifestation values for the other variable category coinciding with the manifestation value for the variable category in the plurality of historical data points and corresponding to a second space containing every historical manifestation of the dependent variable in the plurality of historical data points that a given predictor manifestation predicts;

detecting an anomaly in a new data point that is not included in the plurality of historical data points and that has a corresponding manifestation value for each one of the plurality of variable categories based on the restriction index for the corresponding manifestation value for at least one of the plurality of variable categories in the new data point; and causing a notification of the anomaly in the new data point to be displayed on a computing device based on the detecting of the anomaly.

9. The system of claim 8, wherein the causing the notification of the anomaly in the new data point to be displayed comprises causing at least one user interface element to be displayed on the computing device in association with the notification of the anomaly in the new data point, the at least one user interface element being configured to store a modification to the new data point in a database based on input from a user of the computing device.

10. The system of claim 8, wherein the detecting of the anomaly in the new data point comprises calculating a score for the new data point based on the corresponding restriction index for the corresponding manifestation value for each one of the plurality of variable categories in the new data point, the anomaly being detected based on a determination that the calculated score is equal to or greater than a minimum threshold value stored in a database, and the operations further comprise:

determining that a user of the computing device has dismissed the notification without modifying the new data point in the database;

increasing the minimum threshold value stored in the database; and detecting another anomaly in another new data point using the increased minimum threshold value stored in the database.

11. The system of claim 8, wherein the detecting of the anomaly in the new data point is performed in response to receiving a request from the computing device of the user to display the new data point.

12. The system of claim 8, wherein the notification of the anomaly in the new data point is caused to be displayed concurrently with the new data point on the computing device.

13. The system of claim 8, wherein the corresponding manifestation value for each one of a plurality of variable categories comprises a non-numerical value.

14. The system of claim 8, wherein the plurality of historical data points comprises a plurality of purchase orders.

15. A non-transitory machine-readable storage medium, tangibly embodying a set of instructions that, when executed by at least one hardware processor, causes the at least one processor to perform operations comprising:

generating at least one contingency table based on a plurality of historical data points, each one of the plurality of historical data points having a corresponding manifestation value for each one of a plurality of variable categories, the at least one contingency table comprising, for each one of the manifestation values for each one of the plurality of variable categories, a corresponding number of times the manifestation value for the variable category coincides with each manifestation value of each other variable category of the plurality of variable categories in the plurality of historical data points;

for each one of the manifestation values for each one of the plurality of variable categories, calculating a corresponding restriction index for each manifestation value for each other variable category in the plurality of variable categories based on a manifestation space value and a prediction space value using the at least one contingency table, the manifestation space value comprising a number of different manifestation values for the other variable category in the plurality of historical data points and corresponding to a first space containing every historical manifestation of a dependent variable in the plurality of historical data points, and the prediction space value comprising a number of different manifestation values for the other variable category coinciding with the manifestation value for the variable category in the plurality of historical data points and corresponding to a second space containing every historical manifestation of the dependent variable in the plurality of historical data points that a given predictor manifestation predicts;

detecting an anomaly in a new data point that is not included in the plurality of historical data points and that has a corresponding manifestation value for each one of the plurality of variable categories based on the restriction index for the corresponding manifestation value for at least one of the plurality of variable categories in the new data point; and causing a notification of the anomaly in the new data point to be displayed on a computing device based on the detecting of the anomaly.

16. The non-transitory machine-readable storage medium of claim 15, wherein the causing the notification of the anomaly in the new data point to be displayed comprises causing at least one user interface element to be displayed on the computing device in association with the notification of the anomaly in the new data point, the at least one user interface element being configured to store a modification to the new data point in a database based on input from a user of the computing device.

17. The non-transitory machine-readable storage medium of claim 15, wherein the detecting of the anomaly in the new data point comprises calculating a score for the new data point based on the corresponding restriction index for the corresponding manifestation value for each one of the plurality of variable categories in the new data point, the anomaly being detected based on a determination that the calculated score is equal to or greater than a minimum threshold value stored in a database, and the operations further comprise:

determining that a user of the computing device has dismissed the notification without modifying the new data point in the database;

increasing the minimum threshold value stored in the database; and detecting another anomaly in another new data point using the increased minimum threshold value stored in the database.

18. The non-transitory machine-readable storage medium of claim 15, wherein the detecting of the anomaly in the new data point is performed in response to receiving a request from the computing device of the user to display the new data point.

19. The non-transitory machine-readable storage medium of claim 15, wherein the notification of the anomaly in the new data point is caused to be displayed concurrently with the new data point on the computing device.

20. The non-transitory machine-readable storage medium of claim 15, wherein the corresponding manifestation value for each one of a plurality of variable categories comprises a non-numerical value.

\* \* \* \* \*